United States Patent [19]

Patel

[11] Patent Number: 5,388,341
[45] Date of Patent: Feb. 14, 1995

[54] VIRTUAL TWO GAUGE PROFILE SYSTEM

[75] Inventor: Bipin Patel, Gaithersburg, Md.

[73] Assignee: Data Measurement Corporation, Gaithersburg, Md.

[21] Appl. No.: 102,055

[22] Filed: Aug. 4, 1993

[51] Int. Cl.$^6$ ............................ G01B 5/06; G01B 7/06
[52] U.S. Cl. ............................ 33/501.03; 33/501.02; 73/159
[58] Field of Search ........... 33/501.02, 501.03, 501.04, 33/835, 553, 554, 555, 552; 73/159

[56] References Cited

U.S. PATENT DOCUMENTS

| | | | |
|---|---|---|---|
| 3,190,261 | 6/1965 | Ziffer | 33/501.02 X |
| 3,474,668 | 10/1969 | Mangan | 73/159 |
| 3,528,002 | 7/1970 | Dunlavey | 33/501.03 X |
| 3,670,568 | 6/1972 | Kubo | 73/159 |
| 3,673,865 | 7/1972 | Michaelson | 73/159 |
| 4,031,752 | 6/1977 | Sanders | 73/159 |
| 4,476,717 | 10/1984 | Murphy | 73/159 |

*Primary Examiner*—Alvin Wirthlin
*Attorney, Agent, or Firm*—Evenson, McKeown, Edwards & Lenahan

[57] ABSTRACT

A method and system for measuring a profile of a strip of material produced in a reversing mill in which a direction of travel of the strip is reversible includes a single thickness gauge that measures the thickness of the strip and generates the thickness signals, and a moving device coupled to the gauge. The moving device controllably moves the gauge transversely to the strip so that the gauge measures the thickness of the strip and different points across a width of the strip in one pass of the strip through the gauge. The moving device maintains the gauge in a stationary position in another pass of the strip through the gauge such that the gauge measures the thickness of the strip and different points along the longitudinal lines of the strip. The measurements of the thickness of the strip at the different points are interpreted into profile data. This profile data can be either displayed or used by a mill computer to control the processing of the strip.

22 Claims, 4 Drawing Sheets

VIRTUAL TWO GAUGE PROFILE SYSTEM

BACKGROUND AND SUMMARY OF THE INVENTION

The present invocation relates to a profile system for measuring a profile of a strip of continuously moving material produced by a mill.

In typical mill systems, a strip of material is produced in a continuously moving manner. For quality control, the profile of the material needs to be measured from edge to edge of the strip. Typically, the thickness measurement used to develop the profile is performed without contact with the material, but this measurement can also be done with a gauge contact For example, the measurement of thickness can be made by a beam of radiation, by measurement of backscatter radiation, ultrasonic, or absorption of radiation.

As the product is moving longitudinally through the mill, a gauge moving transversely across the strip will not give a true profile measurement of the thickness across the strip, but rather a long, longitudinal cross cut. To obviate this problem, a system in common use, in particular in steel hot strip mills, uses two gauges. Such a system is shown in FIG. 1. A first gauge remains stationary in the center of the strip, while a second gauge is moved transversely. The readings of the two gauges are plotted as a function of transversal distance. In this manner, longitudinal variations in the strip thickness are not taken into account. Only transversal variations are represented. Since each gauge can cost in the hundreds of thousands of dollars, the problem with this system is that it is expensive due to the need for two gauges.

Another problem represented by these two gauges is the problem of size. Each of the gauges is relatively large. In some applications, such as a reversing mill. there is a relatively small space requirement between a mill stand and a coiler box to keep the coil hot during the rolling process. The coffer box is placed as close as possible to the mill stand so that the metal remains hot. Using two gauges to provide a thickness measurement undesirably lengthens the distance between the furnace and the mill stand.

Another known gauge that measures the profile of a strip uses a single gauge that is stationary, but does not measure the thickness of the strip material in a punctual manner.

Instead, the single gauge uses a plurality of scattering radiation emitters and sensors to provide a spread of radiation across the entire width of the strip. However, because the material is moving rapidly through the mill and the gauge, this method provides only an averaging of the profile over a relatively large area of the strip. It is therefore not as accurate as scanning performed in a punctual manner.

There is thus a need for a system and a method for measuring the profile of a strip of continuously moving material using a single gauge to measure the thickness of the strip in a punctual manner.

These and other needs are met by the present invention which provides a profile system for measuring a profile of the strip of material produced in a reversing mill in which a direction of travel of the strip is reversible. The system comprises a single thickness gauge that measures the thickness of the strip and generates thickness signals. The moving device is coupled to the gauge and controllably moves the gauge transversely to the strip such that the gauge measures the thickness of the strip at different points across a width of the strip in one pass of the strip through the gauge. The gauge is maintained in the stationary position in another pass of the strip through the gauge such that the gauge measures the thickness of the strip at different points along a longitudinal line of the strip. Means are provided for interpreting measurements of the thickness of the strip at different points into profile data. This means for interpreting is connected to the gauge to receive the thickness signals.

The above-stated needs are also met by the present invention which provides a method of producing profile data of the strip of material with a single gauge and comprises passing the strip past the gauge and moving the gauge transversely relative to the strip as the strip is passed past the gauge. The thickness of the strip is measured at various points of the strip and various points of the strip across the width of the strip as the strip is passed past the gauge. A first set of signals are generated indicating the thickness measurements of the strip across the width of the strip. The strip is again passed past the gauge and the gauge is maintained in the stationary position as the strip again passes. The thickness of the strip is measured at various points of the strip along the longitudinal line of the strip as the strip is passed past the gauge. A second set of signals is generated indicating the thickness measurement of the strip along the longitudinal line. Profile data is generated from the first and second set of signals.

By taking advantage of the multiple passes through the mill of the strip of material, the present invention provides a system which uses a single gauge that is either stationary or moved transversely relative to the strip during the multiple passes of the strip through the mill. This allows only a single gauge to be used to perform in a punctual manner the two measurements needed to provide a profile, rather than the two gauges that have typically been used in known systems.

Other objects, advantages and novel features of the present invention will become apparent from the following detailed description of the invention when considered in conjunction with the accompanying drawings.

DETAILED DESCRIPTION OF THE DRAWINGS

Figure 1:
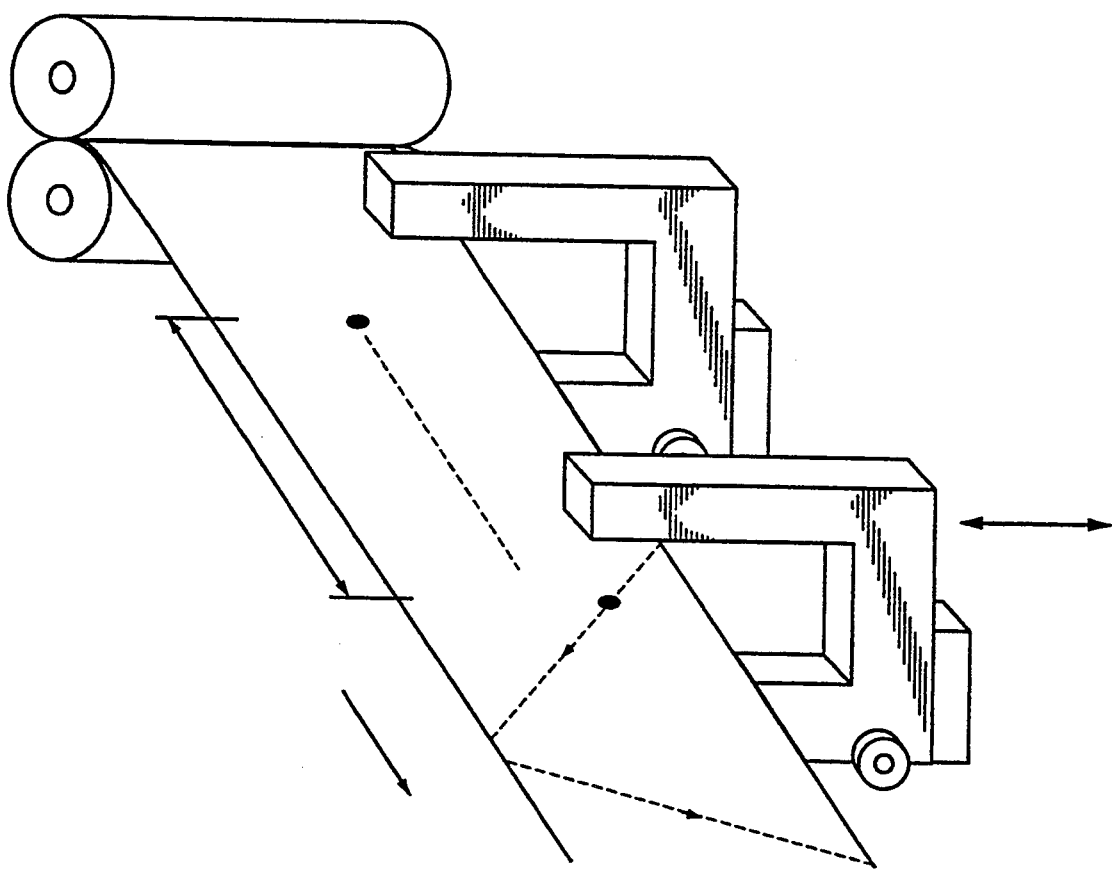
FIG. 1 illustrates a prior art gauge configuration using two gauges to measure sheet thickness.

FIG. 1 illustrates a prior an gauge system using two gauges to measure the profile of a strip of continuously moving material, with one gauge being stationary. and the other gauge being movable transversely relative to the strip. In the illustrated system, the material moves in one direction only.

The system of the present invention uses a single one of the gauges of the general type illustrated in FIG. 1, but applied in a reversing mill in which the moving material makes multiple passes through the gauge. Such a gauge performs its measurement of thickness in a punctual manner, such as bypassing a beam of radiation through the metal, or by measurement of backscatter radiation, ultrasonic measurement, or absorption radiation. Furthermore, the gauge can also perform in a contact manner, rather than in a non-contact manner, as provided with known contact gauges.

Figure 2:
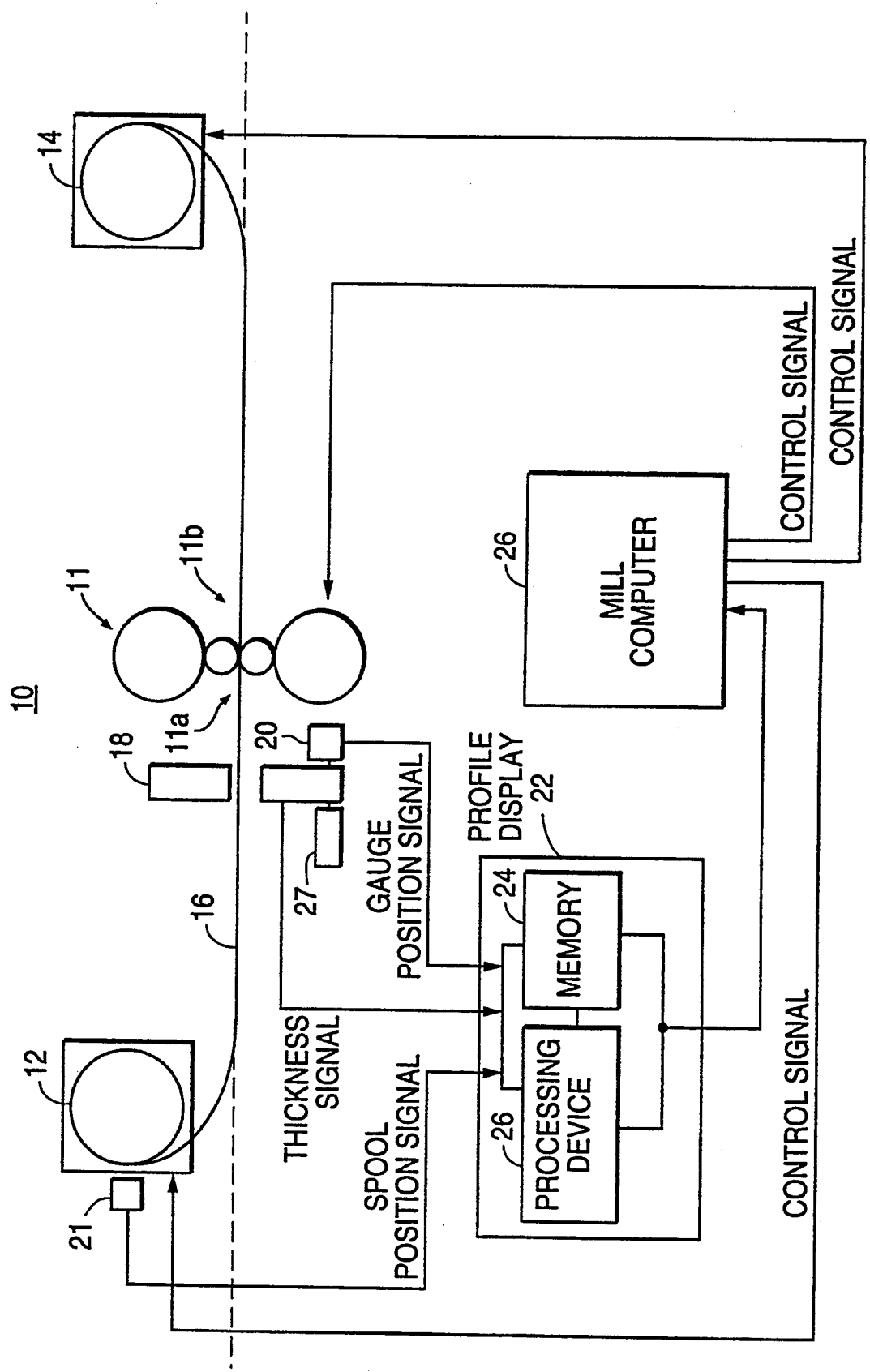
FIG. 2 shows a first embodiment of the present invention.

FIG. 2 illustrates a first embodiment of the invention in which a mill 10 having a mill stand 11 is provided for processing a strip 16. An example of such a mill 10 is a Steckel mill, well known to those of ordinary skill in the art.

The mill 10 has a first spool 12 located within a furnace and a second spool 14 also located within a furnace. The strip 16 is processed by the mill 10 by passing the strip 16 from the first spool 12 to a second spool 14 through the mill stand 11. The strip 16 is then unwound from the second spool 14 to the first spool 12 and back and forth in this manner until it is processed to the desired amount. The mill stand 11 has an entry side 11a and an exit side 11b, the strip 16 being brought into the mill 10 originally from the entry side 11a and finally exiting the mill 10 from the exit side 11b and bypassing the second spool 14. A single gauge 18 is mounted between the mill stand 1I and the first spool 12. The gauge 18 can be a standard C-type gauge such as that illustrated in the embodiment of FIG. 1. The gauge 18 is mounted to be movable, such as on a track (not shown). The praise position of the gauge 18 relative to the strip 16 is provided by a gauge tachometer 20, or any other gauge position measurement device that would provide a precise measurement. The gauge tachometer is a known device that provides a precise measurement of the position of the gauge relative to the strip 16. The gauge tachometer 20 provides its gauge position signal to a profile display 22 that includes a memory 24 and a processing device 25.

The longitudinal position of the strip 16 relative to the gauge 18 also needs to be known with precision. For this purpose, a known spool tachometer 21 is provided at the first spool 12. In a known manner, the spool tachometer 2I provides a spool position signal to the profile display 22 that is a function of the position of the strip 16 as it is unwound relative to the gauge 18.

In operation, the material in coil form is pieced on the first spool 12 and fed between the rolls of the mill stand 11 to the second spool 14, being the rolling operation, the strip is unwound from the first spool 12 and rewound on the second spool 14 at a higher speed than in the rolling operation during which the thickness of the material is reduced. At the end of this first pass, the operation is reversed and the strip 16 is unwound from the second spool 14 and rewound on the first spool 12.

During the second pass, as the strip 16 moves from the second spool 14 to the first spool 12, the gauge 18 is left at the center of the strip 16. The processing device 25 of the profile display 22 records in the memory, 24 the measured thickness at point along the longitudinal line (in this instance, the center line) during this pass. At the same time, the spool tachometer 21 provides the spool position signal that measures each position of the point where the thickness is obtained during this second pass.

During the third pass, as the strip 16 moves from the first spool 12 back to the second spool 14, the gauge 18 is caused to scan transversely across the strip 16. The processing device 25 records in memory. 24 the position of the thickness as a function of a position of the strip 16 provided by the spool tachometer 21 and of the position across the strip 16 provided by the gauge tachometer 20. Naturally, the gauge 18 can measure transversely in the second pass and along the longitudinal line in the third pass, rather than the order described above.

Figure 4:
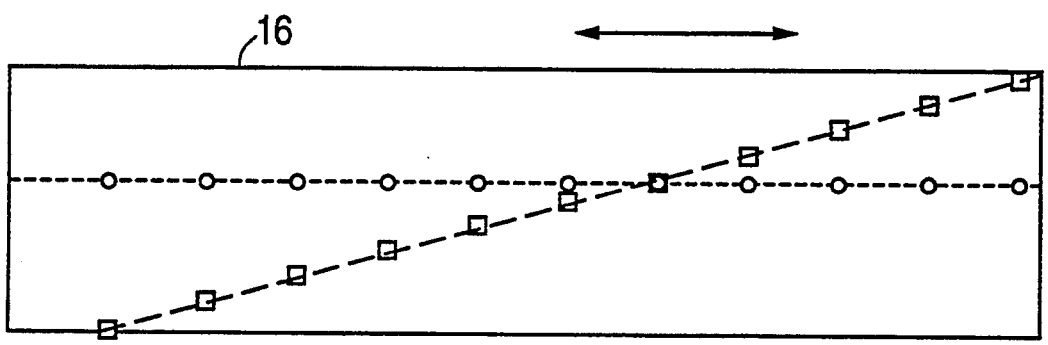
FIG. 4 shows a top view of a sheet of metal and exemplary measuring points taken by the system according to the present invention.

The processing device 25 performs a subtraction of the thickness data between the data obtained in the second and third passes for the corresponding points (measured at the same longitudinal point along the strip 16) for each of the measured points. An example of the measuring points, as seen in a top view of the strip 16, is illustrated in FIG. 4. The measuring points at which thickness measurements were taken during the second pass along the longitudinal center line in the strip 16 are illustrated by circles, while measuring points for the thickness measurements taken during a third pass when the gauge 18 is moving transversely to the strip 16 are indicated by squares.

Figure 5A:
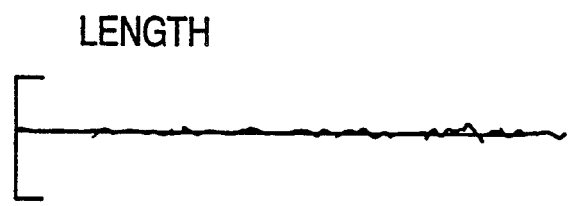
FIGS. 5a and 5b illustrate exemplary profile displays assembled from the data collected at the measuring points illustrated in FIG. 4.
Figure 5B:
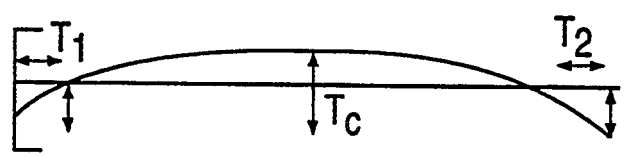
Figure 2:
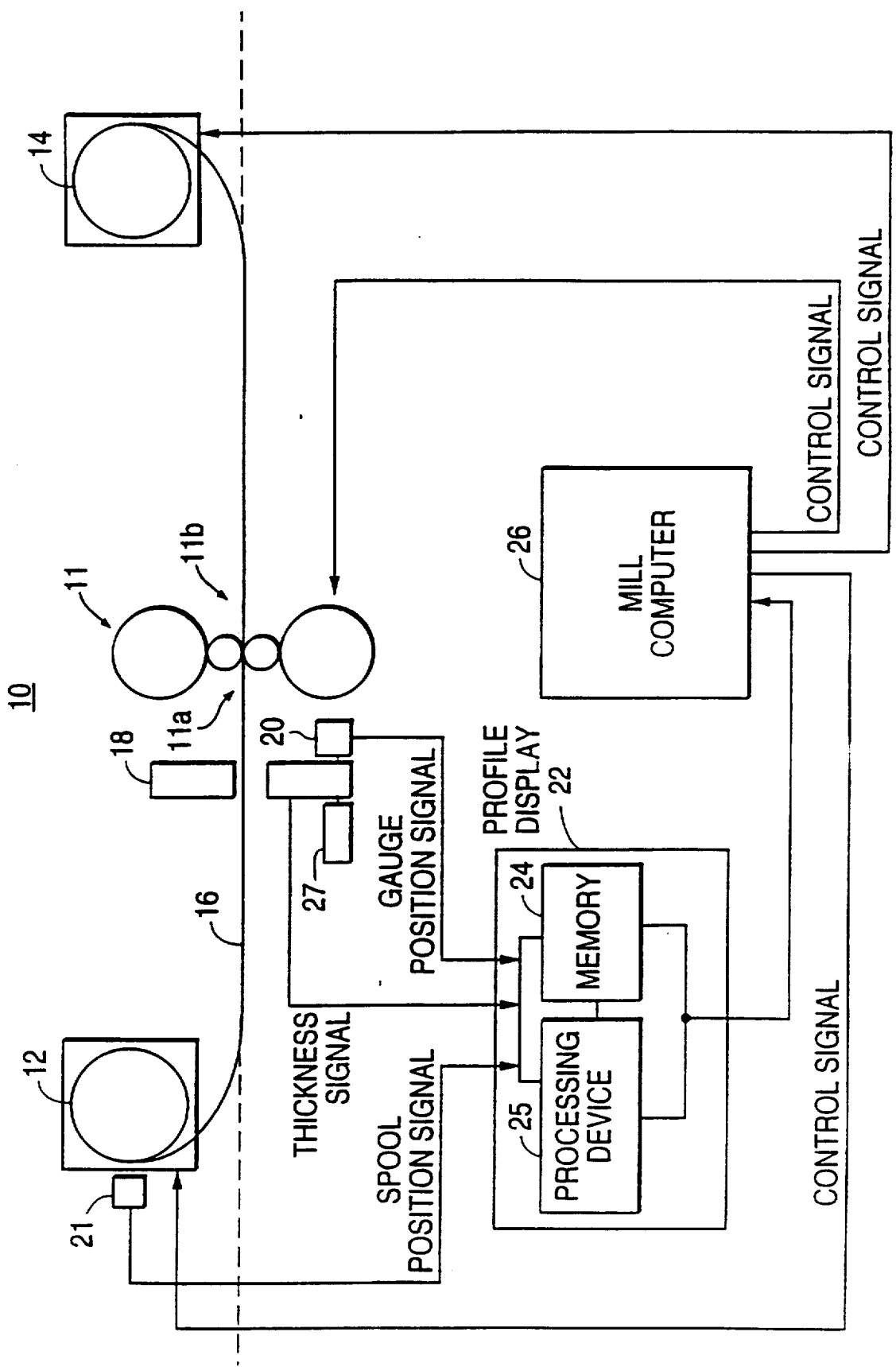

The profile display 22, provided with the information of the thickness measurements, produces a display such as shown in the exemplary displays illustrated in FIGS. 5a and 5b. The top display shows the variation of thickness along the longitudinal length of the strip 16, while the bottom display shows the width profile (variation of thickness along the width) of the strip 16. For mill control purposes, the values of "crown" and "wedge" are derived from this data, with $$\text{crown} = T_c - \left( \frac{T_1 + T_2}{2} \right)$$

and wedge=$T_1$-$T_2$, where $T_1$ and $T_2$ are the thickness measurements of the strip 16 at selected distances from the opposite sides of the strip, as shown in FIG. 5b.

As can be sen from the above, the present invention provides with a single gauge the same measurements and profile information as provided with a two gauge system, but reduces the expense and the size required for providing this information. It does so by taking advantage of the multiple passes of the strip 16 made in the reversing mill 10.

The programming of the processing device 25 to store and correlate the position thickness measurements is well within the level of one of ordinary skill in the art.

Instead of a Processing by the profile display 22, the signals can also be provided to a mill computer 26 which controls the operation of the mill 10. The signals can either come directly from the tachometers 20, 2I and the gauge 18, or through the profile display 22. Based upon the profile data, the mill computer 26 may change conditions in the mill 10 to thereby change the profile of the strip 16.

Figure 3:
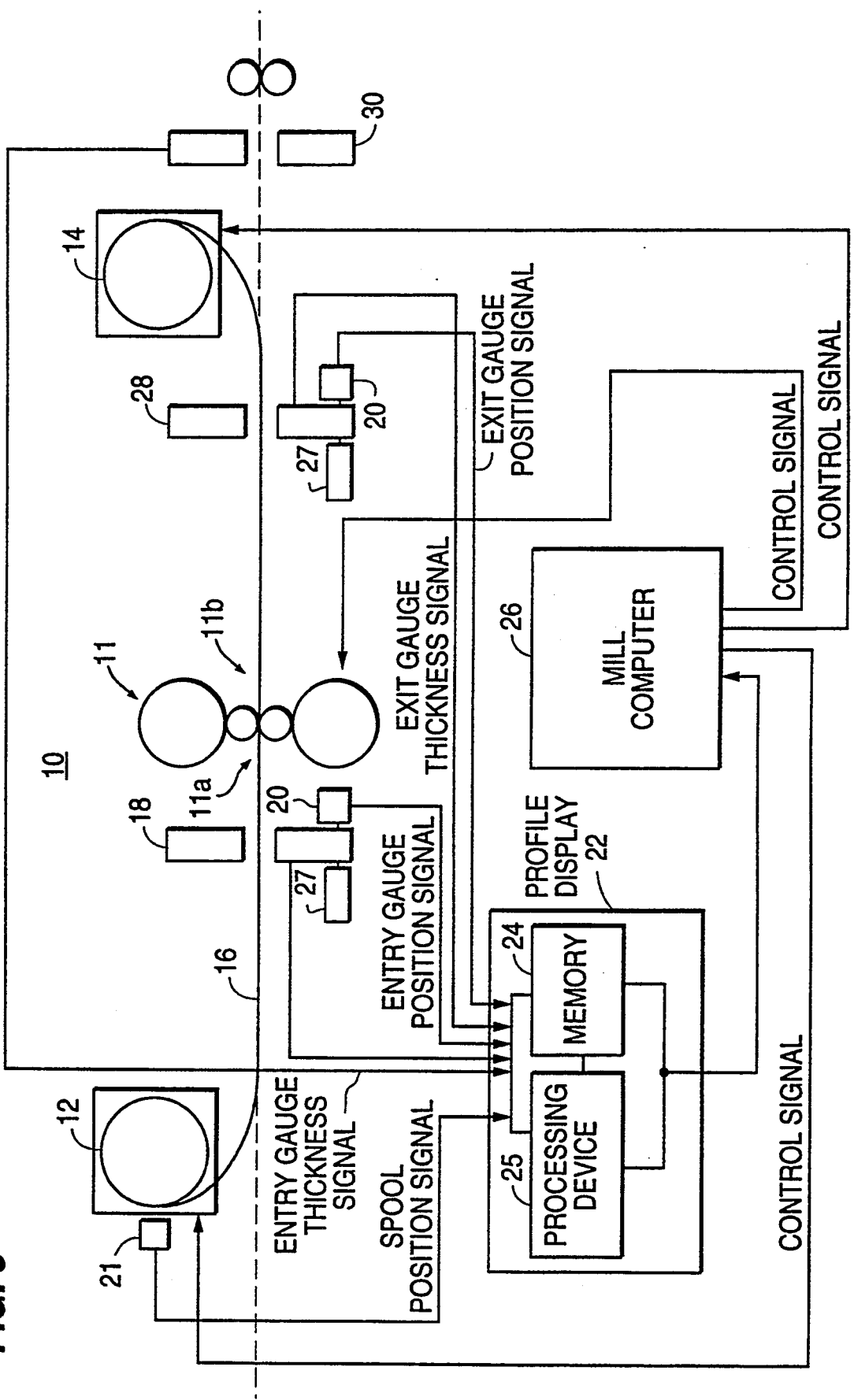
FIG. 3 shows another embodiment of the present invention.

Another embodiment of the invention is illustrated in FIG. 3 and includes a second gauge 28 mounted on the exit side 11b of the mill stand 11. The gauges 18 and 28 now respectively form an entry gauge and an exit gauge. The exit gauge 28 performs the same movement and provides the same type of signals to the mill computer 26 or profile display 22 as the entry gauge 18. The addition of the exit gauge 28 provides more precise control of the entire milling process since measurements are taken on both sides 11a. 11b of the mill stand 11.

A third gauge, which can be, for example a conventional stationary gauge 30, measures the profile of the strip 16 airier it completes its processing through the mill 10. The information from this gauge 30 can also be provided to the mill computer 26 for further control of the process.

The gauges 18 and 28 can be driven, for example, by a chain drive 27 in their transverse movements, this chain drive 27 being schematically indicated in FIGS. 2 and 3. Other types of moving devices can be substituted for the chain drive 27 without the departing from the scope of the invention.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A profile system for measuring a profile of a strip material produced in a reversing mill in which a direction of travel of the strip is reversible, the system comprising:
    a single thickness gauge that measures thickness of the strip and generates thickness signals;
    a moving device coupled to the gauge for controllably moving the gauge transversely to the strip such that the gauge measures the thickness of the strip at different points across a width of the strip along a length of the strip in one pass of the strip through the gauge, and maintaining the gauge in a stationary position in another pass of the strip through the gauge such that the gauge measures the thickness of the strip at different points along a longitudinal line of the strip along said length; and
    means for interpreting measurements of the thickness of the strip at the different points into profile data the means for interpreting being connected to the gauge to receive the thickness signals.

2. A system according to claim 1, further comprising a gauge position measurement device coupled to the means for interpreting, the gauge position measurement device generating a gauge position signal to the means for interpreting that indicates a transverse position of the gauge relative to the strip.

3. A system according to claim 2, wherein the gauge position measurement device includes a gauge tachometer.

4. A system according to claim 2, further comprising a spool position measurement device coupled to the means for interpreting, the spool position measurement device generating a spool position signal to the means for interpreting that indicates a longitudinal position of the strip relative to the gauge.

5. A system according to claim 4, wherein the sheet position measurement device is a spool position tachometer.

6. A system according to claim 1, further comprising a reversing mill that has a mill stand with an entry side and an exit side with the gauge being a first gauge located on the entry side, and further comprising a second gauge located on the exit side and coupled to the means for interpreting to provide a set of thickness signals that indicates the profile of the strip on the exit side of the mill stand, the second gauge being movable in the same manner as the first gauge.

7. A system according to claim 6, further comprising a third gauge located at the exit side after the second gauge and coupled to the means for interpreting, the third gauge being a stationary gauge.

8. A system according to claim 1, wherein the means for interpreting is a profile display.

9. A system according to claim 1, wherein the means for interpreting is a mill computer.

10. A system according to claim 1, wherein the gauge measures the thickness of the strip in a non-contact manner.

11. A system according to claim 1, wherein the gauge measures the thickness of the strip by radiation, 12. A system according to claim 1, wherein the gauge measures the thickness of the strip in a punctual manner.

13. A method of producing profile data of a strip of material with a single gauge, comprising:
    passing a length of the strip past the gauge and maintaining the gauge in a stationary position as the length of the strip is passed past the gauge;
    measuring the thickness of the strip at various points along the length of the strip along a longitudinal line of the strip as the strip is passed past the gauge;
    generating a first set of signals indicating the thickness measurement of the length of the strip along the longitudinal line;
    passing the length of the strip past the gauge a second time and moving the gauge transversely relative to the strip as the strip is passed past the gauge;
    measuring the thickness of the length of the strip at various points of the strip across a width of the strip as the length of the strip is passed past the gauge;
    generating a second set of signals indicating the thickness measurements of the length of the strip across the width of the strip; and
    generating profile data from the first and second set of signals.

14. A method according to claim 13, further comprising storing one of the first and second set of signals until the other set of first and second set of signals are generated.

15. A method according to claim 13, wherein the steps of passing the length of the strips past the gauge include passing the length of the strip past the gauge in a first direction and subsequently passing the length of the strip past the gauge in a second direction opposite to the first direction.

16. A method according to claim 13, further comprising:
    measuring a longitudinal position of the strip relative to the gauge;
    measuring the transverse position of the gauge relative to the strip; and
    providing position signals to means for generating the profile data from the position signals and the first and second set of signals.

17. A method according to claim 13, wherein the steps of measuring the thickness includes non-contact sensing of the thickness of the strip of material.

18. A method according to claim 17 wherein the reversing mill includes first and second spools respectively positioned on opposite sides of the mill stand, each gauge being respectively positioned between one of the first and second spools and the mill stand.

19. A method of producing profile data of a strip of material on each side of a mill stand of a reversing mill with a single gauge respectively positioned on each side of the mill stand comprising:

passing a length of the strip past each gauge and moving each gauge transversely relative to the strip as the length of the strip is passed past the gauge;

measuring the thickness of the strip at various points of the strip along the length of the strip across a width of the strip as the length of the strip is passed past each gauge;

generating a first set of signals for each gauge indicating the thickness measurements of the length of the strip across the width of the strip;

passing the length of the strip past each gauge and maintaining each gauge in a stationary position as the length of the strip is passed past each gauge;

measuring the thickness of the strip at various points for the strip along a longitudinal line of the strip as the length of the strip is passed past each gauge;

generating a second set of signals for each gauge indicating the thickness measurement of the strip along the longitudinal line; and generating profile data for the strip on each side of the mill stand from the first and second sets of signals from the respective gauges.

20. A method according to claim 19, wherein the reversing mill includes an exit for the strip of material, and further comprising measuring the profile of the strip of material with a third gauge at the exit.

21. A profile system data of a strip of material produced in a reversing mill in which a direction of travel of the strip is reversible the system comprising:

a single thickness gauge that measures thickness of the strip and generates thickness signals;

a moving device coupled to the gauge for maintaining the gauge in a stationary position in a first pass of the strip through the gauge such that the gauge measures the thickness of the strip at different points along a longitudinal line of the strip along a length of the strip, and controllably moving the gauge transversely to the strip such that the gauge measures the thickness of the strip at different points across a width of the strip along the length of the strip in a second pass of the strip through the gauge; and means for interpreting measurements of the thickness of the strip at the different points into profile data the means for interpreting being connected to the gauge to receive the thickness signals.

22. A method of profile data of a strip of material with a single gauge, comprising;

passing the strip past the gauge and moving the gauge transversely relative to the strip as a length of the strip is passed past the gauge;

measuring the thickness of the strip at various points of the strip across a width of the strip as the length of the strip is passed past the gauge;

generating a first set of signals indicating the thickness measurements of the strip across the width of the strip;

passing the length of the strip past the gauge and maintaining the gauge in a stationary position as the length of the strip is passed past the gauge;

measuring the thickness of the strip at various points of the length of the strip along a longitudinal line of strip as the length of the strip is passed past the gauge;

generating a second set of signals indicating the thickness measurement of the strip along the longitudinal line; and generating profile data from the first and second set of signals.

* * * * *

UNITED STATES PATENT AND TRADEMARK OFFICE
CERTIFICATE OF CORRECTION

PATENT NO. : 5,388,341
DATED : February 14, 1995
INVENTOR(S) : Bipin Patel

It is certified that error appears in the above-indentified patent and that said Letters Patent is hereby corrected as shown below:

Column 1, line 6, change "invocation" to --invention--;

Column 1, line 15, after "contact" insert --.--;

Column 1, line 37, delete "." (second occurrence);

Column 1, line 40, change "coffer" to --coiler--.

Column 2, line 63, change "an" to --art--;

Column 2, line 65, delete ".".

Column 3, line 29, change "1I" to --11--;

Column 3, line 33, change "praise" to --precise--;

Column 3, line 46, change "2I" to --21--;

Column 3, line 49, change "pieced" to --placed--;

Column 3, line 51, change "14, being" to --14. During--;

Column 3, line 61, delete ",";

Column 3, line 62, change "point" to --points--.

Column 4, line 4, delete ".";

Column 4, line 42, change "sen" to --seen--;

Column 4, line 52, change "Processing" to --processing--;

Column 4, line 55, change "2I" to --21--.

Column 5, line 5, change "airier" to --after--.

UNITED STATES PATENT AND TRADEMARK OFFICE
CERTIFICATE OF CORRECTION

PATENT NO. : 5,388,341

DATED : February 14, 1995

INVENTOR(S) : Bipin Patel

It is certified that error appears in the above-indentified patent and that said Letters Patent is hereby corrected as shown below:

Column 5, line 5, change "airier" to --after--.

In the drawing, the drawing sheet consisting of Fig. 2, should be deleted and replaced with the drawing sheet, consisting of Fig. 2, as shown on the attached page.

Signed and Sealed this

Seventeenth Day of October, 1995

*Attest:*

BRUCE LEHMAN

*Attesting Officer*  *Commissioner of Patents and Trademarks*